(12) United States Patent
Sagi et al.

(10) Patent No.: US 7,558,679 B2
(45) Date of Patent: Jul. 7, 2009

(54) SYSTEM AND METHOD FOR IRRADIATING A SAMPLE

(75) Inventors: Irit Sagi, Rehovot (IL); Arnon Henn, Rehovot (IL); Jacob Halfon, Rishon Lezion (IL)

(73) Assignee: Yeda Research and Development Company Ltd., Rehovot (IL)

( * ) Notice: Subject to any disclaimer, the term of this patent is extended or adjusted under 35 U.S.C. 154(b) by 202 days.

(21) Appl. No.: 10/495,484

(22) PCT Filed: Oct. 7, 2002

(86) PCT No.: PCT/IL02/00811

§ 371 (c)(1),
(2), (4) Date: May 13, 2004

(87) PCT Pub. No.: WO03/046609

PCT Pub. Date: Jun. 5, 2003

(65) Prior Publication Data

US 2004/0259263 A1 Dec. 23, 2004

(30) Foreign Application Priority Data

Nov. 25, 2001 (IL) .................................... 146714

(51) Int. Cl.
*G01N 33/48* (2006.01)
*G01N 31/00* (2006.01)
*G06F 19/00* (2006.01)

(52) U.S. Cl. .............................. 702/19; 702/20; 702/22
(58) Field of Classification Search ........................ None
See application file for complete search history.

(56) References Cited

U.S. PATENT DOCUMENTS 4,608,707 A * 8/1986 Gabbay et al. .............. 378/132

FOREIGN PATENT DOCUMENTS

| EP | 0 872 872 A1 | 10/1998 |
| GB | 343220 A | 2/1931 |
| GB | 2 145 221 A | 3/1985 |
| JP | 10-300900 A | 11/1998 |
| JP | 2003-502036 | 1/2003 |
| WO | 00/77184 | 12/2000 |

OTHER PUBLICATIONS

Franchet-Beuzit et al. "Radiolytic Footprinting. Beta-Rays, Gamma-photons, and Fast Neutrons Probe DNA-Protein Interactions" Biochemistry (1993) vol. 32, pp. 2104-2110).*
Henn et al. "Nucleic acid fragmentation on the milisecond timescale using a conventional X-ray rotating anode source: application to protein-DNA footprinting" Henn et al. Nucleic Acids Research, 2001, vol. 29, No. 24, pp. 1-10.*

Chance, Mark R., "Unfolding of Apomyoglobin Examined by Synchrontron Footprinting", *Biochemical and Biophysical Research Communications*, vol. 287, pp. 614-621, (2001).
Henn, Arnon, et al., "Nucleic acid fragmentation on the millisecond timescale using a conventional X-ray rotating anode source: application to protein-DNA footprinting", *Nucleic Acids Research*, vol. 29, No. 24, e122 pp. 1-10, (2001).
Sclavi, Bianca, et al., "Time-resolved Synchrotron X-ray "Footprinting", a New Approach to the Study of Nucleic Acid Structure and Function: Application to Protein-DNA Interactions and RNA Folding", *Journal of Molecular Biology*, vol. 266, pp. 144-159, (1997).
Tullius, Thomas D., "Physical Studies of Protein-DNA Complexes by Footprinting", *Annu. Rev. Biophys. Biophys. Chem.*, vol. 18, pp. 213-237, (1989).
Brenowitz, Michael, et al., "Quantitative Dnase Footprint Titration: A Method for Studying Protein-DNA Interactions", *Methods in Enzymology*, vol. 130, pp. 132-181, (1986).
Galas, David J. and Schmitz, Albert, "DNase footprinting: a simple method for the detection of protein-DNA binding specificity", *Nucleic Acids Research*, vol. 5, No. 9, pp. 3157-3170, (Sep. 1978).
Tullius, Thomas D. and Dombroski, Beth A., "Hydroxyl radical "footprinting": High-resolution information about DNA-protein contact and application to λ repressor and Cro protein", *Proc. Natl. Acad. Sci. USA*, vol. 83, pp. 5469-5473, (Aug. 1986).
Tullius, Thomas D., et al., "Hydroxyl Radical Footprinting: A High-Resolution Method for Mapping Protein-DNA Contacts", *Methods in Enzymology*, vol. 155, pp. 537-558 (1987).
Strahs, Daniel and Brenowitz, Michael, "DNA Conformational Changes Associated with the Cooperative Binding of cI-repressor of Bacteriophage λ to $O_R$", *Journal of Molecular Biology*, vol. 244, pp. 494-510, (1994).
King, Peter A., et al., "'Footprinting' proteins on DNA with peroxonitrous acid", *Nucleic Acids Research*, vol. 21, No. 10, pp. 2473-2478, (1993).
Burkhoff, Amanda Milgram and Tullius, Thomas D., "The Unusual Conformation Adopted by the Adenine Tracts in Kinetoplast DNA", *Cell*, vol. 48, pp. 935-943, (Mar. 1987).
Latham, John A. and Cech, Thomas R., "Defining the Inside and Outside of a Catalytic RNA Molecule", *Science*, vol. 245, pp. 276-282, (Jul. 1989).
Celander, Daniel W., et al., "Iron(II) -Ethylenediaminetetraacetic Acid Catalyzed Cleavage of RNA and DNA Oligonucleotides: Similar Reactivity toward Single- and Double-Stranded Forms", *Biochemistry*, vol. 29, No. 6, pp. 1355-1361, (Feb. 1990).
Franchet-Beuzit, Jenny, et al., "Radiolytic Footprinting. βRays, λ Photons, and Fast Neutrons Probe DNA-Protein Interactions", *Biochemistry*, vol. 32, pp. 2104-2110, (1993).

(Continued)

*Primary Examiner*—Eric S Dejong
(74) *Attorney, Agent, or Firm*—The Nath Law Group; Susanne M. Hopkins; Ari G. Zytcer (57) ABSTRACT

Method and system for footprinting a nucleic acid molecule. A sample consists of a nucleic acid molecule in an environment in which —OH radicals are generated when the environment is irradiated with an X-ray beam having an intensity less than $10^9$ photons $sec^{-1}$ $mm^{-2}$ for an amount of time less than 1,000 msec. The sample is then irradiated with an X-ray beam having an intensity less than $10^9$ photons $sec^{-1}$ $mm^{-2}$ for an amount of time less than 1,000 msec so as to generate —OH radicals in the environment. Fragmentation of the nucleic acid molecule is then detected.

2 Claims, 6 Drawing Sheets

OTHER PUBLICATIONS

Heyduk, Tomasz, et al., "Hydroxy Radical Footprinting of Proteins Using Metal Ion Complexes", *Metal Ions in Biological Systems*, vol. 38, pp. 255-287, (2001).

Klassen, Norman V., "Primary Products in Radiation Chemistry", *Radiation Chemistry: Principles and Applications*, VCH publishing inc., pp. 29-64, (1987).

Von Sonntag, Clemens, "The Chemistry of Free-Radical-Mediated DNA Damage", *Basic Life Science*, vol. 58, pp. 287-317 (discussion pp. 317-321), (1991).

Hayes, Jeffery J., et al., "Footprinting Protein-DNA Complexes With λ-Rays", *Methods in Enzymology*, vol. 186, pp. 545-549, (1990).

Sclavi, Bianca, et al., "Following the Folding of RNA with Time-Resolved Synchrotron X-Ray Footprinting", *Methods in Enzymology*, vol. 295, pp. 379-402, (1998).

Hampel, Ken J. and Burke, John M., "Time-Resolved Hydroxyl-Radical Footprinting of RNA Using Fe(II) -EDTA", *Methods*, vol. 23, pp. 233-239, (2001).

Ralston, Corie Y., et al., "Stability and cooperativity of individual tertiary contacts in RNA revealed through chemical denaturation", *Nature Structural Biology*, vol. 7, No. 5, pp. 371-374, (May 2000).

Petri, Victoria and Brenowitz, Michael, "Quantitative nucleic acids footprinting: thermodynamic and kinetic approaches", *Current Opinion in Biotechnology*, vol. 8, pp. 36-44, (1997).

Tullius, Thomas D. and Dombroski, Beth A., "Iron(II) EDTA Used to Measure the Helical Twist Along Any DNA Molecule", *Science*, vol. 230, pp. 679-681, (Nov. 1985).

Yang, Shu-Wei and Nash, Howard A., "Specific photocrosslinking of DNA-protein complexes: Identification of contacts between integration host factor and its target DNA", *Proc. Natl. Acad. Sci*, USA, vol. 91, pp. 12183-12187, (Dec. 1994).

Namito, Y., et al., "Compton scattering of 20- to 40-keV photons", *Physical Review A*, vol. 51, No. 4, pp. 3036-3043, (1995).

Namito, Y., et al., "Implementation of linearly-polarized photon scattering into EGS4 code", *Nuclear Instruments and Methods in Research*, Sec. A, vol. 322, pp. 277-283, (1993).

Dixon, Wendy J., et al., "Hydroxyl Radical Footprinting", *Methods in Enzymology*, vol. 208, pp. 380-413, (1991).

Tullius, Thomas D., "DNA Footprinting with the Hydroxyl Radical", *Free Rad. Res. Comms.*, vols. 12-13, pp. 521-529, (1991).

Pastor, Nina, et al., "A Detailed Interpretation of OH Radical Footprints in a TBP-DNA Complex Reveals the Role of Dynamics in the Mechanism of Sequence-specific Binding", *Journal of Molecular Biology*, vol. 304, pp. 55-68, (2000).

Ralston, Corie Y., et al., "Time-Resolved Synchrotron X-Ray Footprinting and Its Applications to RNA Folding", *Methods in Enzymology*, vol. 317, pp. 353-368, (2000).

Rice, Phoebe A., et al., "Crystal Structure of an IHF-DNA Complex: A Protein-Induced DNA U-Turn", *Cell*, vol. 87, pp. 1295-1306, (Dec. 1996).

Dhavan, Gauri M., et al., "Concerted Binding and Bending of DNA by *Eschericia coli* Integration Host Factor", *Journal of Molecular Biology*, vol. 315, pp. 1027-1037, (2002).

Hubbell, J.H., et al., "Atomic Form Factors, Incoherent Scattering, Functions, and Photon Scattering Cross Sections", *J. Phys. Chem. Ref.*, vol. 4, No. 3, pp. 471-494, (1975).

Wu, John C., et al., "The Mechanism of Free Base Formation from DNA by Bleomycin", *The Journal of Biological Chemistry*, vol. 285, pp. 4694-4697, (Apr. 1983).

Botchway, S.W. et al., "Induction and Rejoining of DNA Double-Strand Breaks in Chinese Hamster V79-4 Cells Irradiated with Characteristic Aluminum K and Copper L Ultrasoft X Rays," Radiation Research, 1997, pp. 317-324, vol. 148 (4), Radiation Research Society.

* cited by examiner

| TARGET | ENERGY (KeV) | CALCULATED PHOTON FLUX (ph s⁻¹mm⁻²) | CALCULATED ENERGY FRACTION ABSORBED IN THE SAMPLE (%) | % FRACTION CLEAVED 1 SEC X-RAY EXPROSURE |
|---|---|---|---|---|
| Silver (Ag) | 22.162 | $6.2 \times 10^8$ | 9.36 | 4 |
| Molibdium (Mo) | 17.478 | $5.7 \times 10^8$ | 17.84 | 14 |
| Copper (Cu) | 8.047 | $3.3 \times 10^8$ | 81.13 | 21 |

FIG. 8

SEQUENCE LISTING

<160> NUMBER OF SEQ ID NOS: 2

<210> SEQ ID NO 1
<211> LENGTH: 34
<212> TYPE: DNA
<213> ORGANISM: Homo sapiens

<400> SEQUENCE: 1
ataaaaaagc attgcttatc aatttgttgc aagg                                34

<210> SEQ ID NO 2
<211> LENGTH: 34
<212> TYPE: DNA
<213> ORGANISM: Homo sapiens

<400> SEQUENCE: 2
ccttgcaaca aattgataag caatgctttt ttat                                34

SYSTEM AND METHOD FOR IRRADIATING A SAMPLE

FIELD OF THE INVENTION

This invention relates to biophysical methods, and more specifically relates to such methods for irradiating a sample, particularly a sample containing a biological molecule.

PRIOR ART

The following is a list of prior art which is considered to be pertinent for describing the state of the art in the field of the invention. Acknowledgement of these references herein will be made by indicating the number from their list below within brackets.

REFERENCES

1. Tullius, T. D. (1989) Physical studies of protein-DNA complexes by footprinting. *Annu Rev Biophys Biophys Chem*, 18, 213-37.
2. Brenowitz, M., Senear, D. F., Shea, M. A. and Ackers, G. K. (1986) Quantitative DNase footprint titration: a method for studying protein-DNA interactions. *Methods Enzymol*, 130, 132-81.
3. Galas, D. J. and Schmitz, A. (1978) DNAse footprinting: a simple method for the detection of protein-DNA binding specificity. *Nucleic Acids Res*, 5(9), 3157-70.
4. Tullius, T. D. and Dombroski, B. A. (1986) Hydroxyl radical "footprinting": high-resolution information about DNA-protein contacts and application to lambda repressor and Cro protein. *Proc Natl Acad Sci USA*, 83(15), 5469-73.
5. Tullius, T. D., Dombroski, B. A., Churchill, M. E. and Kam, L. (1987) Hydroxyl radical footprinting: a high-resolution method for mapping protein-DNA contacts. *Methods Enzymol*, 155, 537-58.
6. Strahs, D. and Brenowitz, M. (1994) DNA conformational changes associated with the cooperative binding of cI-repressor of bacteriophage lambda to OR. *J Mol Biol*, 244(5), 494-510.
7. King, P. A., Jamison, E., Strahs, D., Anderson, V. E. and Brenowitz, M. (1993) 'Footprinting' proteins on DNA with peroxonitrous acid. *Nucleic Acids Res*, 21(10), 2473-8.
8. Burkhoff, A. M. and Tullius, T. D. (1987) The unusual conformation adopted by the adenine tracts in kinetoplast DNA. *Cell*, 48(6), 935-43.
9. Latham, J. A. and Cech, T. R. (1989) Defining the inside and outside of a catalytic RNA molecule. *Science*, 245 (4915), 276-82.
10. Celander, D. W. and Cech, T. R. (1990) Iron(II)-ethylenediaminetetraacetic acid catalyzed cleavage of RNA and DNA oligonucleotides: similar reactivity toward single- and double-stranded forms. *Biochemistry*, 29(6), 1355-61.
11. Franchet-Beuzit, J., Spotheim-Maurizot, M., Sabattier, R., Blazy-Baudras, B. and Charlier, M. (1993) Radiolytic footprinting. Beta rays, gamma photons, and fast neutrons probe DNA-protein interactions. *Biochemistry*, 32(8), 2104-10.
12. Isabelle, V, Franchet-Beuzit, J., Sabattier, R., Spotheim-Maurizot, M. and Charlier, M. (1994) Sites of strand breakage in DNA irradiated by fast neutrons. *Biochimie*, 76(2), 187-91.
13. Sclavi, B., Woodson, S., Sullivan, M., Chance, M. R. and Brenowitz, M. (1997) Time-resolved synchrotron X-ray "footprinting", a new approach to the study of nucleic acid structure and function: application to protein-DNA interactions and RNA folding. *J Mol Biol*, 266(1), 144-59.
14. Klassen, N. V. (1987), Radiation Chemistry Principles & Applications. VCH, Taxes, pp. 29-61.
15. von Sonntag, C. (1991) The chemistry of free-radical-mediated DNA damage. *Basic Life Sci*, 58, 287-317; discussion 317-21.
16. Hayes, J. J., Kam, L. and Tullius, T. D. (1990) Footprinting protein-DNA complexes with gamma-rays. *Methods Enzymol*, 186, 545-9.
17. Sclavi, B., Woodson, S., Sullivan, M., Chance, M. and Brenowitz, M. (1998) Following the folding of RNA with time-resolved synchrotron X-ray footprinting. *Methods Enzymol*, 295, 379-402.
18. Hampel, K. J. and Burke, J. M. (2001) Time-Resolved Hydroxyl-Radical Footprinting of RNA Using Fe(II)-EDTA. *Methods*, 23(3), 233-239.
19. Ralston, C. Y, He, Q., Brenowitz, M. and Chance, M. R. (2000) Stability and cooperativity of individual tertiary contacts in RNA revealed through chemical denaturation. *Nat Struct Biol*, 7(5), 371-4.
20. Petri, V. and Brenowitz, M. (1997) Quantitative nucleic acids footprinting: thermodynamic and kinetic approaches. *Curr Opin Biotechnol*, 8(1), 36-44.
21. Tullius, T. D. and Dombroski, B. A. (1985) Iron(II) EDTA used to measure the helical twist along any DNA molecule. *Science*, 230(4726), 679-81.
22. Yang, S. W. and Nash, H. A. (1994) Specific photocrosslinking of DNA-protein complexes: identification of contacts between integration host factor and its target DNA. *Proc Natl Acad Sci USA*, 91(25), 12183-7.
23. Nelson, W. R., Hirayama, H. and Rogers, D. W. O. (1985), pp. 265.
24. Namito, Y., Ban, S. and Hirayama, H. (1995) *Phys. Rev.*, 51, 3036-3043.
25. Namito, Y., Ban, S. and Hirayama, H. (1993) Implementation of linearly-polarized photon scattering into the EGS4 code. *Nucl. Instrum. Methods Phys. Res*, 332, 277-283.
26. Dixon, W. J., Hayes, J. J., Levin, J. R., Weidner, M. F., Dombroski, B. A. and Tullius, T. D. (1991) Hydroxyl radical footprinting. *Methods Enzymol*, 208, 380-413.
27. Tullius, T. D. (1991) DNA footprinting with the hydroxyl radical. *Free Radic Res Commun*, 12-13 Pt 2, 521-9.
28. Pastor, N., Weinstein, H., Jamison, E. and Brenowitz, M. (2000) A detailed interpretation of OH radical footprints in a TBP-DNA complex reveals the role of dynamics in the mechanism of sequence-specific binding. *J Mol Biol*, 304 (1), 55-68.
29. Ralston, C. Y, Sclavi, B., Sullivan, M., Deras, M. L., Woodson, S. A., Chance, M. R. and Brenowitz, M. (2000) Time-resolved synchrotron X-ray footprinting and its application to RNA folding. *Methods Enzymol*, 317, 353-68.
30. Rice, P. A., Yang, S., Mizuuchi, K. and Nash, H. A. (1996) Crystal structure of an IHF-DNA complex: a protein-induced DNA U-turn. *Cell*, 87(7), 1295-306.
31. Dhavan, G. M., Crothers, D. M., Chance, M. R. and Brenowitz, M. (2001) Concerted Binding and Bending of DNA by *Eschericia coli* Integration Host Factor. Submmited.
32. Hubell, J. H., Veigele, W. J., Briggs, E. A., Brown, R. T., Cromer, D. T. and Howerton, R. J. (1975) Atomic Form Factors, Incoherent Scattering Functions, and Photon Scattering Cross Sections. *J. Phys. Chem. Ref. Data*, 4, 471.
33. Wu, J. C., Kozarich, J. W. and Stubbe, J. (1983) The mechanism of free base formation from DNA by bleomy- cin. A proposal based on site specific tritium release from Poly(dA.dU). *J Biol Chem,* 258(8), 4694-7.

34. Heyduk, T., Baichoo, N. and Heyduk, E. (2001) Hydroxyl radical footprinting of proteins using metal ion complexes. *Met Ions Biol Syst,* 38, 255-87.

BACKGROUND OF THE INVENTION

Interactions between proteins and nucleic acids and nucleic acid conformations are commonly examined by "footprinting" methods. In these methods, a nucleic acid molecule is fragmented by applying an agent that produces nicks in the phosphodiester backbone of the molecule. Regions of the molecule devoid of nicks are then sought. Such regions devoid of nicks are regions that were protected from the effects of the agent. Such protection may be due, for example, to binding of a ligand to a specific sequence of bases in the nucleic acid or to the conformation of the molecule[1, 2]. The prerequisite of such assays is the ability to produce and detect high-quality nucleic acid fragmentation. Nucleic acid fragmentation can be achieved by using a variety of enzymatic and chemical reagents[3]. Another method of nucleic acid fragmentation referred to as "chemical hydroxyl radical footprinting" uses Fenton chemistry[4-6] and peroxonitrous acid[7]. In this method, hydroxyl radicals (—OH) engender breaks of the phosphodiester backbone in a non-specific sequence manner. Using hydroxyl radical methods over enzymatic footprinting is advantageous because it provides great sensitivity to nucleic-acid structures, such as sequence-dependent curvature[8] and RNA folding[9].

Nucleic acid cleavage by hydroxyl radical is predominantly dependent upon the solvent accessibility of the phosphodiester backbone. Additionally, it is relatively insensitive to base sequence, and it is not important whether the nucleic acid is single or double stranded[10]. —OH can be generated by Fe-EDTA catalysis or by γ-rays, β particles, fast neutrons, and X-ray radiation[11-13]. The radiolysis of water by X-rays with energies from 100 eV up to the MeV range produces free electrons and —OH according to the overall reaction illustrated in equation (1)[14].

(1)

The —OH generated by this reaction can abstract a hydrogen from the C'4 carbon of the ribose sugar of DNA and RNA, leading to breakage of the phosphodiester backbone of the polymer[15]. Controlled exposure of protein-nucleic acid complexes to X-rays has been used to detect specific interactions within such complexes[11, 16]. X-ray mediated footprinting has been shown to be an attractive method for time-resolved footprinting studies, because it can produce a high flux of —OH that fragments the nucleic acid backbone in millisecond time scales with basepair resolution. The recent development of synchrotron time-resolved X-ray footprinting demonstrated the utilization of this method to study dynamic structural changes in RNA folding[17].

High radiation sources like synchrotron can produce a sufficiently high photon flux to generate a sufficient concentration of —OH radicals to fragment nucleic acids within of tenths of milliseconds[13]. However, the use of a synchrotron radiation source in footprinting is limited due to its relative inaccessibility and the high cost of its operation.

SUMMARY OF THE INVENTION

In its first aspect, the present invention provides a system for irradiating a sample. In accordance with this aspect of the invention, the system comprises an X-ray generator that generates ax X-ray beam having an intensity less than $10^9$ photons sec$^{-1}$ mm$^{-2}$. For example, a rotating anode may be used in the system. The system also comprises a shutter capable of alternating between open and closed states such that the shutter may be in the open state for a predetermined amount of time less than 1,000 msec. In its second aspect, the invention provides a method for irradiating a sample. In accordance with this aspect of the invention, a sample is irradiated with an X-ray beam having an intensity less than $10^9$ photons sec$^{-1}$ mm$^{-2}$. The sample is exposed to the radiation for an amount of time less than 1000 msec.

The invention may be used, for example, to irradiate a sample containing nucleic acid molecules so as to generate —OH radicals in the sample and to fragment the molecules. This allows —OH radical footprinting of DNA to be performed in time scales suitable for studying the structural kinetics of RNA folding[19] and protein-nucleic acid interactions[20].

The invention provides a system for irradiating a sample comprising:
 (a) an X-ray generator capable of generating an X-ray beam having an intensity less than $10^9$ photons sec$^{-1}$ mm$^{-2}$; and
 (b) a shutter alternating between an open state in which the sample is irradiated by the X-ray beam and a closed state in which the sample is not irradiated by the X-ray beam, the shutter being configured to be in the open state for an amount of time less than 1,000 msec.

The invention still further provides a method for irradiating a sample, comprising irradiating the sample with an X-ray beam having an intensity less than $10^{-9}$ photons sec$^{-1}$ mm$^{-2}$m and for an amount less than 1,000 msec.

Yet still further the invention provides a method for footprinting a nucleic acid molecule comprising:
 (a) placing the nucleic acid molecule in an environment in which —OH radicals are generated when the environment is irradiated with an X-ray beam having an intensity less than $10^9$ photons sec$^{-1}$ mm$^{-2}$ for an amount of time less than 1,000 msec;
 (b) irradiating the environment with an X-ray beam having an intensity less than $10^9$ photons sec$^{-1}$ mm$^{-2}$ for an amount of time less than 1,000 msec so as to generate OH radicals in the environment;
 (c) detecting fragmentation of the nucleic acid molecule.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS OF THE INVENTION

Figure 1:
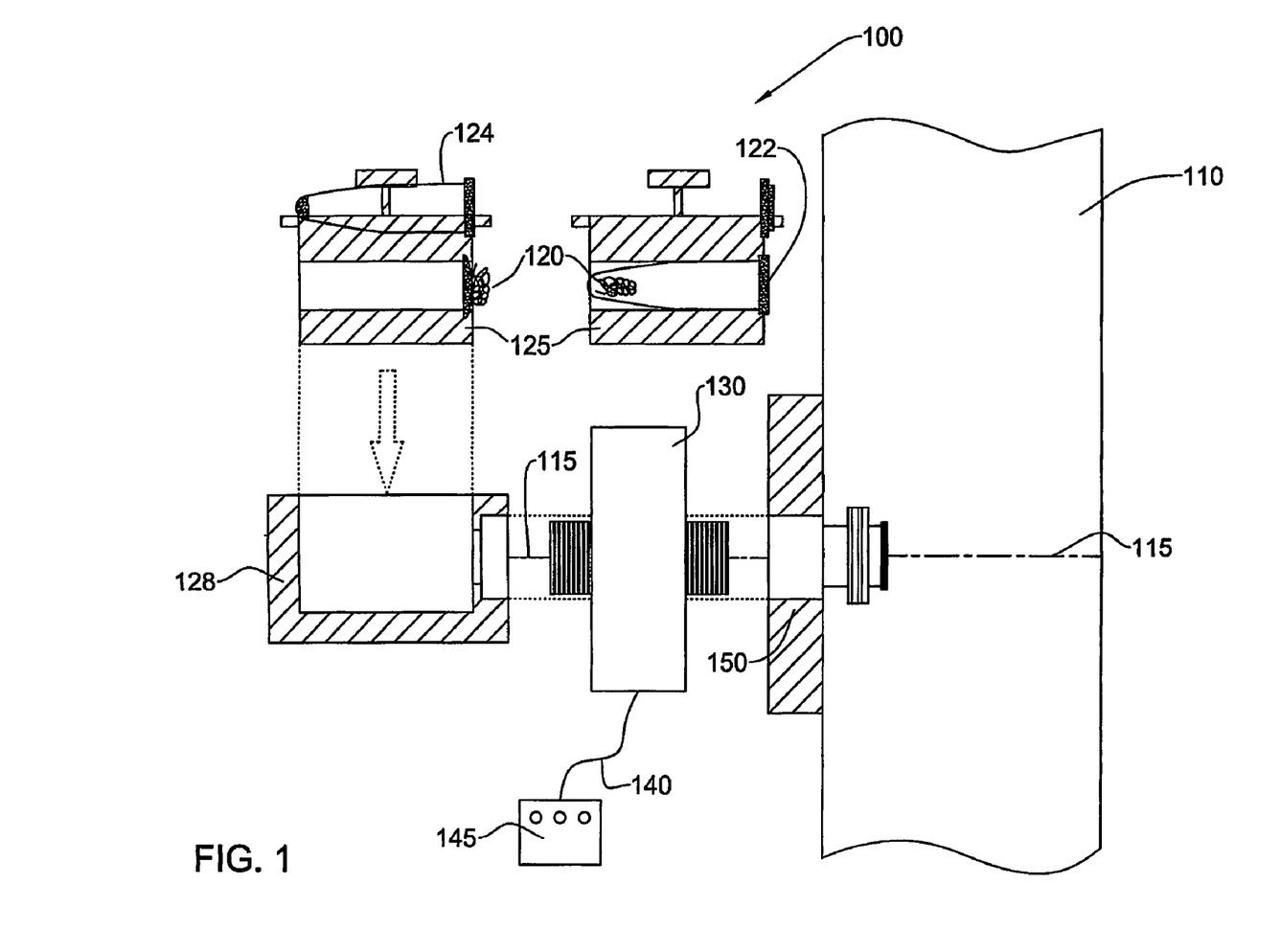
FIG. 1 shows a system for irradiating a sample in accordance with one embodiment of the invention.

FIG. 1 shows a schematic representation of a system for irradiating a sample, generally designated by 100, in accordance with one embodiment of the invention. The system comprises a model RTP 500 rotating anode tube 110 purchased from Rigaku, Japan. The rotating anode machine 110 generates an X-ray beam 115 that irradiates a sample 120. As explained below, in the embodiment of FIG. 1, the sample 120 is either placed at the bottom of an Eppendorf tube 122 or on the cover of an Eppendorf tube 124. The Eppendorf tube 122 or 124 is then placed in a sample holder 125 which in turn is inserted into an adapter 128 so as to position the sample in the X-ray beam 115.

In accordance with the invention, the system 100 comprises an electronic shutter 130 purchased from Vincent Associates, Rochester, N.Y. The electronic shutter 130 is used for setting exposure times of up to 1,000 msec. The electronic shutter 130 is preferably kept in a vacuum until the X-rays exit the anode tube 110. In order to further minimize the distance that the X-ray beam travels in air between the anode tube 110 and the sample, the sample is preferably placed in the cap of the Eppendorf tube 124. The electronic shutter 130 is controlled through a cable 140 from a remote control box 145 that was purchased from Vincent Associates, Rochester, N.Y. The electronic shutter was rigorously tested for X-ray resistance.

The system 100 may optionally have a manual mechanical shutter 150 that may be used for setting exposure times of over 1 sec. When the manual shutter 150 is used, the sample 120 is placed at the bottom of an Eppendorf tube 122. The Eppendorf tube is then placed in the adapter 125 with the sample positioned in the X-ray beam 115. In the embodiment of FIG. 1, the X-ray beam 115 travels 3.6 cm in air from the manual shutter 150 to the bottom of the Eppendorf tube 122.

All of the inserted devices are preferably made of brass. This allows direct irradiation of the sample with the X-ray beam without any divergence.

The system of FIG. 1 was used to perform footprinting of DNA molecules as described in the following examples.

Materials and Methods

DNA cloning and plasmid purification—A random fragment from E. coli isolated chromosomal DNA, restricted with BamHI and EcoRI restriction enzyme, was cloned into pre-digested pTZ18R (Amersham Pharmacia Biotech) with the same enzymes. After transforming E. coli XL-1 Blue strain (Stratagene), the plasmid was amplified and purified by using a concert nucleic acid purification system kit (GibcoBRL). A DNA fragment was cut by enzymatic restriction to produce a fragment of 140 bp; it was purified with a Millipore-DNA purification kit from 1% agarose gel.

Preparation and end labeling of DNA molecules—DNA was end labeled with Klenow fragment (Roch Molecular Biochemicals) with α-[$^{32}$P]-ATP using standard protocol. The labeled DNA was loaded into 8% PAGE/Tris Borate EDTA (TBE) X 1.0 native gel and the DNA fragment was excised from the gel. The DNA was extracted from the gel by electroelution using the Schleicher & Schuell BIOTRAP system. DNA was precipitated and resuspended in Cacodylic buffer pH 7.5 10 mM.

Chemical footprinting—Fe (II)-EDTA cleavage reactions were performed by the method of Tullius and Dombroski (21). Cleavage reaction components, 1 μl of 0.2% $H_2O_2$, 1 μl of 60 mM sodium ascorbate, and 1 μl Fe (II)-EDTA (60 mM Fe $(NH_4)_2$—$(SO_4)_2$ and 50 mM $Na_2$-EDTA, pH 8 mixed prior to chemical reaction) were added sequentially to the inside wall of an Eppendorf tube. Rapid mixing was then applied by tapping the Eppendorf tube on a surface. Reactions were allowed to proceed for 2 sec and then quenched with 90 μl of 100% ethanol, 0.3 M NaAcc pH 5.2, 0.4 μg tRNA, precipitated in −20° C. and resuspended in loading buffer.

X-ray footprinting—DNA footprinting was performed in siliconized Eppendorf tubes with a specific activity of 60,000 cpm. 10 μl samples of labeled DNA (60,000 cpm specific activity) were incubated on ice prior to exposure to X-rays. Each sample was placed and exposed to X-rays using the device of the invention. The X-ray shutter was open for the indicated time windows. Immediately after exposure to X-rays, the samples were put on ice and combined with an equal volume of loading buffer: 90% formamide, 0.5×TBE buffer, 1 mM EDTA and 0.05 (w/v) xylene cyanole. Samples were kept at −80° C. for further analysis.

Figure 5A:
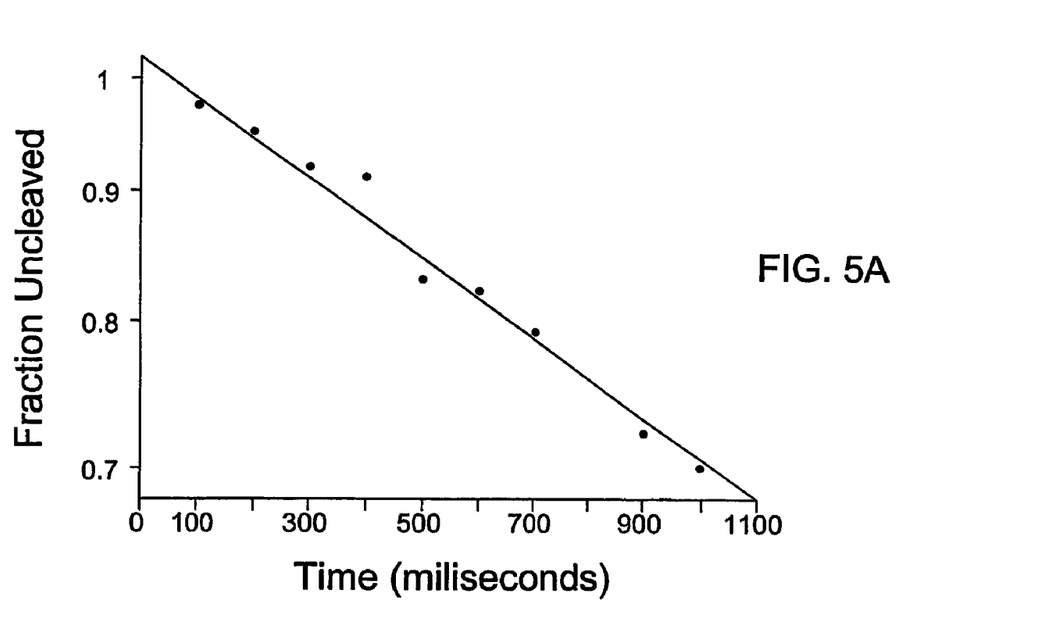
FIG. 5 shows a dose-response curves relating the amount of uncleaved DNA to the time of sample exposure to the X-ray source, controlled by a milliseconds shutter.

Protein-DNA footprinting—Purified Integration host factor M) protein from E. coli and its DNA substrate were provided by Dr. Michael Brenowitz and Gurie Dhavan. IHF was stored in Tris-HCl pH 7.5, 200 mM NaCl, 1 mM EDTA and 5% glycerol. The target DNA substrate of IHF (FIG. 5a) was prepared by PCR amplification of a plasmid carrying IHF consensus sequence[22]. The resulting PCR product of 164 bp was prephosphorylated in one of its primers with cold ATP before the PCR reaction. The second phosphorylation was performed after the PCR with $^{32}$P-γ-ATP, using standard T4 polynucleotide kinase (NEB). DNA was electroeluted as described above. Footprinting reactions were performed in 20 mM Cacodylate buffer at pH 7.5, 50 mM KCl, 1 mM $MgCl_2$, at room temperature for 10 min. The reaction was quenched by ethanol precipitation, resuspended in loading buffer, and analyzed by gel electrophorsis.

Gel electrophoresis—Samples were applied to a pre-warm 10% denaturing polyacrylamide-sequencing gel. Electrophoresis was performed at 50° C. buffered with 1.0×TBE. After completing the run, the gels were fixed with 10% acetic acid and 10% methanol for 20 min, followed by incubation of the gel in 10% glycerol for 20 min. Autoradiographs of the dried gels were analyzed by densitometry using Molecular Dynamics (MD) PhosphoImager Storm 820.

Data analysis of footprinting experiments—Data was analyzed with ImageQuantNT software, (MD). Quantification of the fraction that remained uncut was calculated according the following equation:

$$F = \frac{OD_{n,cut}}{OD_{uncut}}$$

where P equals the uncut fraction, $OD_{n,cut}$ is the measured intensity of the $n^{th}$ band, and $OD_{uncut}$ is the unexposed sample measured intensity. The data were fitted to a semi-logarithmic plot to exponential decay $1^{st}$ order: $Y=y_0+Ae^{-x/t}$. Each data point is an average of two independently performed experiments.

Monte Carlo theoretical simulations of the photon absorption—The last developments in the EGS4 code system (23) for low energy scattering and polarization established the code system as one of the best tools for synchrotron-based X-ray simulations. The modular structure of the low scattering photon transport routines, developed by the KEK EGS group (24,25), enables preparation of compound cross sections with form factors and scattering functions as $H_2O$, air, DNA (as a polymer of $C_5O_5H_7$—P), and polypropylene. The EGS4 system was used to simulate the deposited energy in the footprinting samples for different photon sources. The first user-code was developed to include the National Synchrotron Light Source (NSLS) beam line X9-. A spectrum shape was calculated by information found on the web (http://www-cxro.lbl.gov/optical_constants/bend2.html). Conditions used for calculation were 92% linear polarization ratio, introducing the DNA sample inside the conic-shaped end of a polypropylene "Eppendorf" tube (1.5 ml), sealed by a 1 mm cover made of the same material. The absorbed energies per incident flounce in the cover and in the sample were scored to find the efficiency of the NSLS photon source for footprinting.

Figure 2:
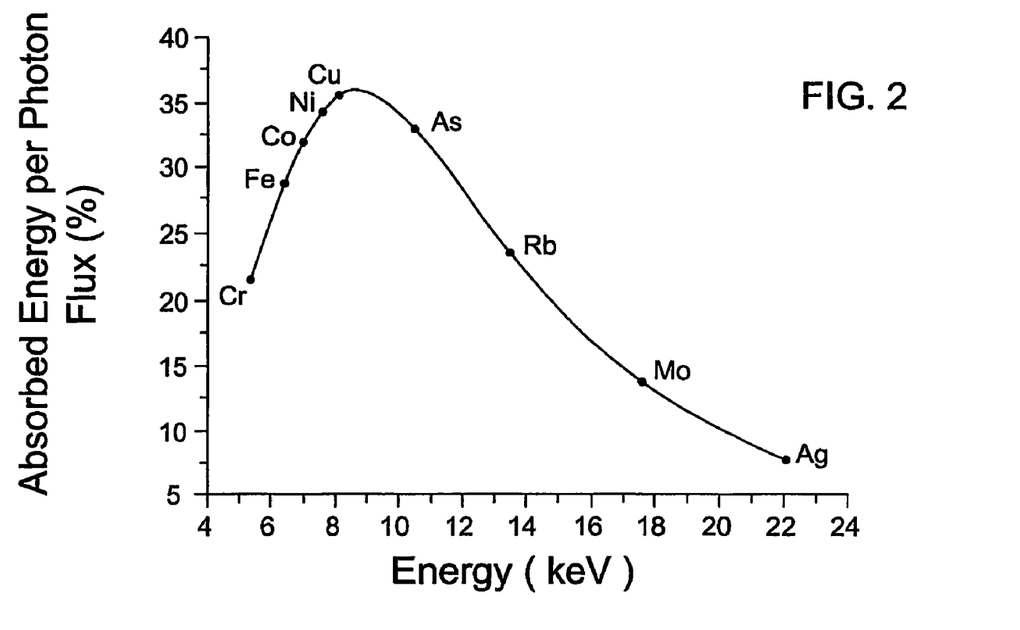
FIG. 2 shows Monte Carlo simulations of the absorbed energy in a DNA sample by different rotating anode target elements.

Another group of user-codes was written for the X-ray generator footprinting irradiation system, which included the filtration (Be, and air), the source energy due to the anode material, and the sample inside the opened polypropylene cylinder (as shown in FIG. 2). The same outputs were applied in the X-ray generator simulations as in the NSLS simulation, with $10^7$ histories for each.

Results

Fragmentation of nucleic acid molecules has been shown to be dependent upon the effective concentration of free radicals, which are generated from water radiolysis[26]. In the case of X-ray footprinting, the concentration of free radicals in solution is controlled by monitoring the X-ray exposure ("dose") received by the DNA/RNA sample. The experimentally determined dose-response curve provides the required X-ray exposure time in which each DNA/RNA molecule is cleaved only once. X-ray exposures resulting in 10-30% of the nucleic acid cleavage implement this requirement. The sample preparation procedure and the buffer system used in these experiments were optimized by conducting dose-response experiments for the different reaction conditions.

Sample preparation—Factors that contribute to —OH radical scavenging were minimized in order to increase the effective concentration of the free radicals in solution. The purification of labeled DNA is usually conducted by extraction from the polyacrylamide gel matrix. This procedure introduces polyacrylamide contamination in the extracted DNA/RNA solution. Therefore, the DNA from the gel matrix was purified by electroelution. This method remarkably lowered the required exposure time of the nucleic acid sample to the X-ray beam to achieve 10-30% of nucleic acid cleavage. In addition, three buffer systems were tested (pH 7.5, 10 mM): Tris-HCl, HEPES-Na, and Cacodylic-Na. The best results were obtained with the Cacodylic buffer. This buffer system is used often in X-ray footprinting procedures[13,18]. Overall, these results show that the sample composition and purification play a key role in the X-ray footprinting assay generated by the rotation anode machine.

Rotating anode parameters—The photon flux intensity and the energy of the rotating anode X-ray source were optimized to achieve maximum yield of nucleic acid fragmentation. This was done using both theoretical and experimental studies. The photon flux generated by the X-ray beam can be calculated for a given operation power and material target. The photon spectral flux for common diagnostic X-ray generators was calculated and summarized in a catalogue (Birch et al, 1979) for a variety of anode materials and tube voltages. The referenced flux value per Amp was multiplied with the rotating anode current to calculate the photon flux exiting the source. The flux-per-amp value of $1.91 \times 10^{6\ ph\ mA^{-1}s^{-1}}mm^{-2}$ for the molibdium (Mo) target, at 50 kV tube voltage, was selected from the catalogue as a reference value without adding filtration, because the filtration was included in the EGS4 Monte Carlo user-code simulation. The source photon flux for a Mo rotating-anode (300 mA) is, therefore, $5.7 \times 10^8$ ph $s^{-1}mm^{-2}$ at 17.48 keV. The photon flux of other low Z-number target materials (such as Copper (Cu), Chromium (Cr), Nickel (Ni), Iron (Fe) anodes) at the $K_\alpha$ emission lines can be compared, due to the Mo florescence yields ratios. These results show that the photon flux generated from rotating anode is one order of magnitude lower than the photon flux used in synchrotron footprinting experiments in which a 200 mA ring current generates $5 \times 10^9$ ph $s^{-1(17)}$.

To calibrate the specific beam energy with the shortest time scales required for effective nucleic footprinting, three different target elements were tested as anodes. The effect of the X-ray energy source on the amount of DNA cut was examined at a given time by conducting dose-response experiments. In this experiment silver (Ag), Mo, and Cu target anodes were used, which represent a relatively wide range of energy: (Ag, $\lambda$=0.56 Å (25.5 KeV); Mo, $\lambda$=0.71 Å (19.9 KeV); Cu, $\lambda$=1.54 Å (8.97 KeV)).

Figure 8:
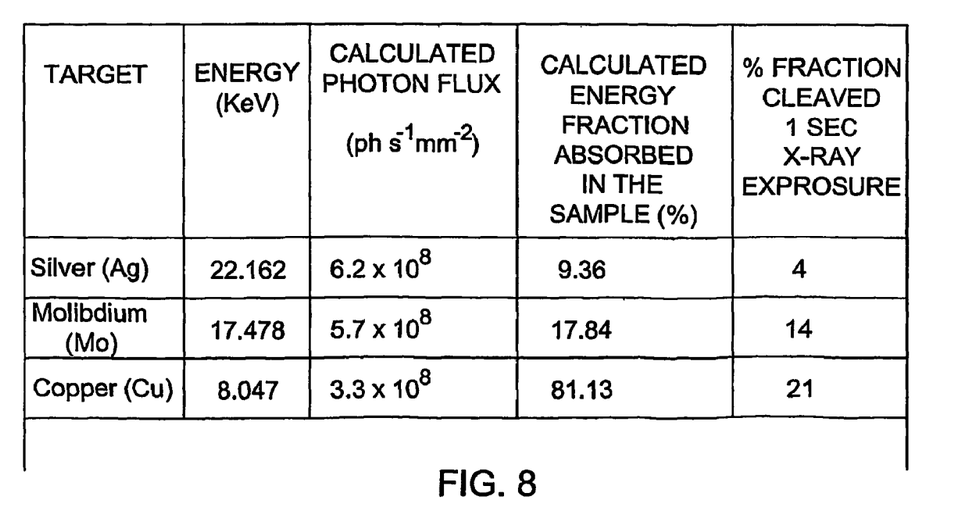
FIG. 8 shows parameters of the rotating anode.

The results of these experiments, as well the calculated values of the photon flux generated from each anode and the percent energy fraction absorbed in the sample, are summarized in the table of FIG. 8. Each result is the average of two independent samples. The Monte Carlo theoretical simulation was conducted as described above in Materials and Methods.

FIG. 8 shows that the Cu anode achieved the most efficient DNA fragmentation, with the given X-ray generator setup, because most of the generated energy is deposited in the sample. Furthermore, the results show that the main factor of efficient DNA cleavage is the amount of energy absorbed in the sample, which is correlated by the specific energy of the source (FIG. 8). To further examine the effect of beam energy on DNA fragmentation, Monte Carlo calculations were performed. In the case of X-ray generators with different anode metals, the absorbed energy resulting from the Monte Carlo simulations was introduced to optimize the rotating anode selection due to the maximum sample radiation absorption. The fluorescence yield of each material was multiplied by the flux to compare the absolute sample absorptions (see also Table 1). FIG. 2 shows the simulation results of sample absorption efficiency versus the anode material Z-number. These results show that the energy at KeV between 7-9.5 contributes the most to the fragmentation of DNA in aqueous solution. This range of energy is consistent with the energy of a Cu rotating anode (9 KeV). Therefore, the Cu rotating anode was found to be the most appropriate material for use with X-ray generator-based footprinting.

X-ray beam intensity—The beam intensity parameter and its relation to percent DNA cut was examined. DNA samples of ~50,000 cpm were exposed to the X-ray beam with Cu target source for 3 seconds at different beam intensities Kw=KeV·mAMPS). DNA samples were analyzed by UREA/

Figure 3:
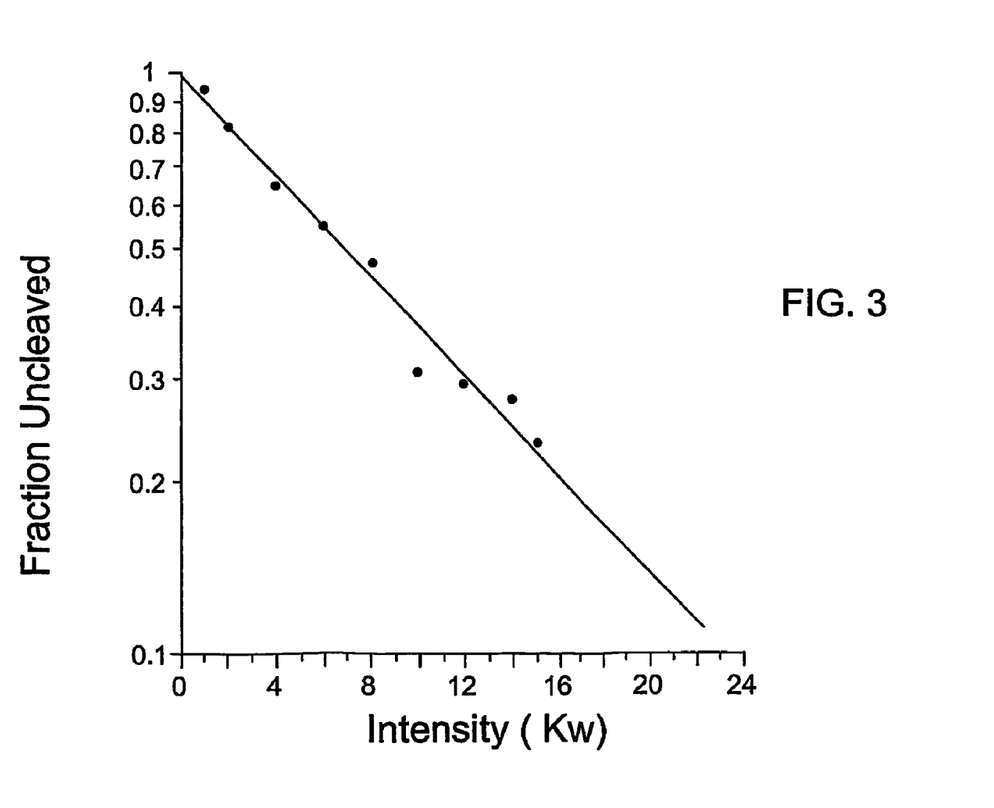
FIG. 3 shows a dose-response curve of beam intensities vs. fraction of uncleaved DNA.

PAGE electrophoresis. The top band on the gels, representing the full-length nucleic acid molecules, was quantified as described in Materials and Methods. The data sets represent two independent determinations. Fragmentation of DNA shows linear relationship to the intensity of the X-ray generator. The linear fit was extrapolated to higher intensity to show the effect of the beam flux (intensity) on the fragmentation of DNA ($R^2=0.98$). FIG. 3 shows the relationship between the intensity of the X-ray beam and the fraction of uncut DNA after exposure to X-ray. These results show that the intensity of the X-ray beam exhibits a linear relationship with the logarithm of the amount of fraction of DNA fragmented. Theoretical extrapolation of the linear line indicates that higher beam intensities resulted in increased percent of DNA fragmentation in less time. Thus, a combination of the appropriate source energy with the highest intensity that can be achieved by the X-ray generator contributes to maximum yield of DNA fragmentation in minimal time scales.

Resolving DNA at basepair resolution—Following nucleic acid fragmentation at basepair resolution requires the nucleic acid fragmentation method to show no discrepancy in cutting preferences. In addition, the electrophotogram of the nucleic acid fragments should be able to resolve long DNA/RNA molecules with high resolution of band separation. Hydroxyl radical had been shown to produce such a pattern of cleavage from both chemical and X-ray sources[13, 27].

Figure 4A:
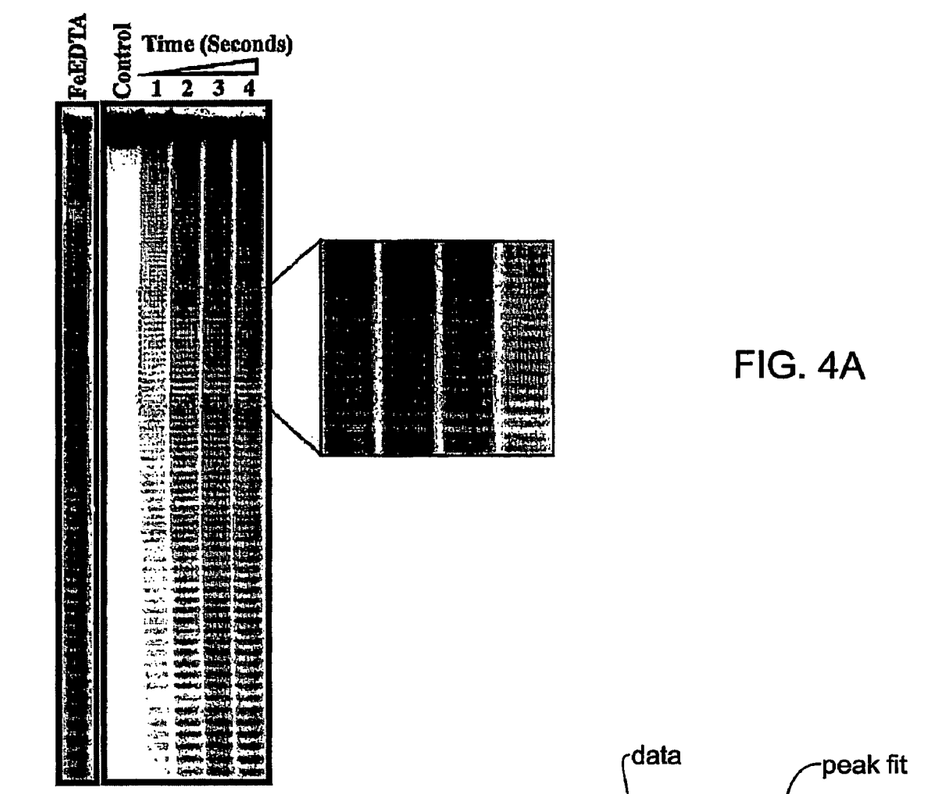
FIG. 4 shows DNA fragmentation by Rotating X-ray Anode in basepair resolution: (a) A basepair resolution portrait of 140 bp DNA fragment after exposure to the X-ray beam, (b) Peak fitting demonstration of the bands intensities resulted from the cleavage pattern of the DNA. The data analysis was performed as described by Pastor et al[28]. The upper graph represents raw data obtained from the program ImageQuant 5.0 (MD) and the lower graph presents the data after performing peak fitting.
Figure 4B:
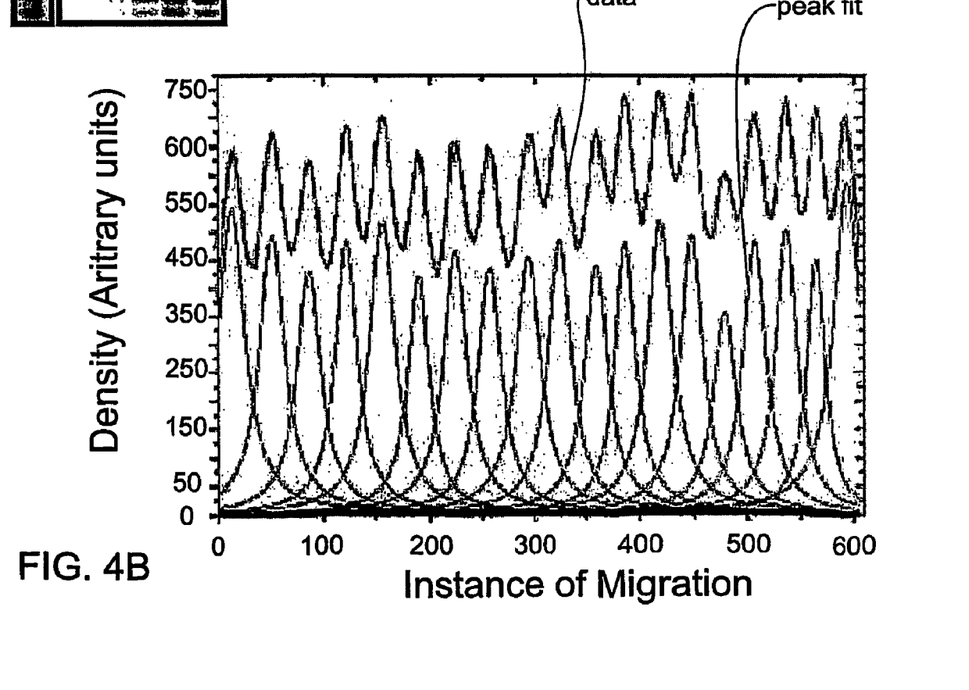

FIG. 4a shows the portrait of 140 bp DNA fragment after exposure to the rotating anode X-ray beam for 1 to 4 seconds. The digital image was obtained by phosphor storage imaging of a 12% UREA/PAGE wedge-spaced gel of the reaction products resulting from a 1-4 seconds exposure to the X-ray beam of a 140 bp DNA $^{32}$P-labeled restriction fragment labeled. The lane designated FeEDTA was treated with the Fenton reaction on the same DNA preparation, but was analyzed on a separate gel using the same conditions as describe above. The insert is an enlargement of the indicated area. The results were comparable to the DNA cleavage patterns obtained by FeEDTA protocols[18]. The X-ray rotating anode footprinting in FIG. 4 shows exceptionally uniform and reproducible cleavage patterns (see insert). The integrated band intensity analysis (FIG. 4b) shows a highly homogeneous pattern throughout a long region of separated gel bands[28]. To better resolve the DNA fragments during electrophoresis, we used wedge gel spacers, which increase the length of separation of nucleic acid as well as the uniformity of the bands. With this arrangement, up to 120 base pairs of a DNA molecule can be resolved with sufficient quality to perform quantitative footprinting analysis. To minimize the path traveled by the X-ray beam in air, the Eppendorf cover cap was used to hold the sample as close as possible to the end of the vacuum line facing the exit of X-rays. With this improved arrangement, the time required to achieve 10-30% DNA cleavage of a given DNA fragment is lowered to the millisecond time regime.

Figure 5B:
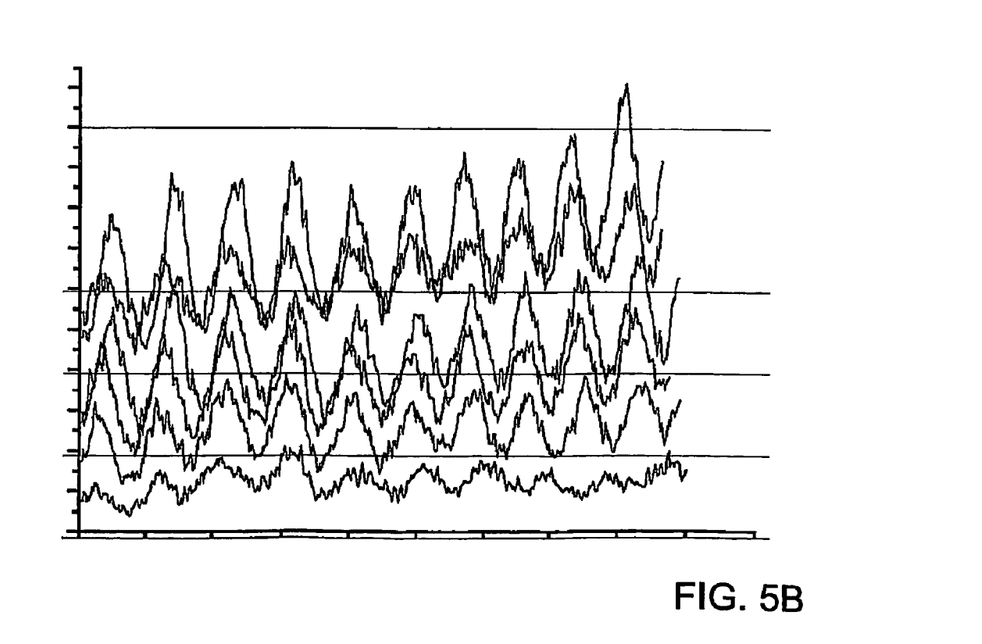

FIG. 5a shows the dose-response results of the 140 bp DNA fragment. Quantification of the fraction uncleaved was calculated as described in Materials and Methods. The results are an average of two independent determinations. The percent DNA cut was measured after exposure to the X-ray source in milliseconds time scales. The dose-response densitometry analysis shows that 10% cleavage occurs in 300 milliseconds (Cu, 60 KeV, 300 mA). Close examination of the signal-to-noise ratio of individual band intensities allows the performance of quantitative footprinting data analysis at time scales as low as 100 milliseconds (13). FIG. 5b shows the densitometry scans through the 140 bp DNA fragment in various exposure times to the X-ray beam. The top right insert represents various densitometry scans through a region of 10 bases in the middle region of the gel obtained after different exposure times. The scans from bottom to top are of 0 (background), 100, 300, 500, 700 and 1000 milliseconds. The integrated band intensities at 100 milliseconds show a 3-fold increase in band intensity over the background and 10-fold increase at 1 second.

Figure 6A:
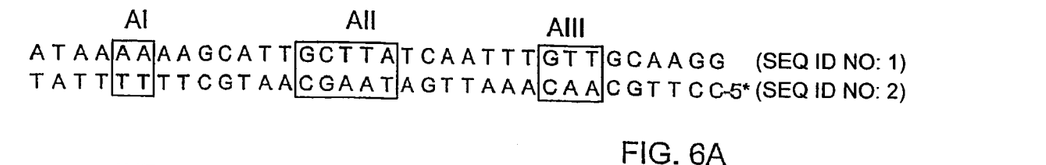
FIG. 6 shows footprinting of IHF-DNA complex: (a) the IHF binding DNA sequence, (b) 10% sequencing gel of 165 bp DNA $^{32}$P-labeled, (c) containing a 34 bp region of IHF binding sequence.
Figure 6B:
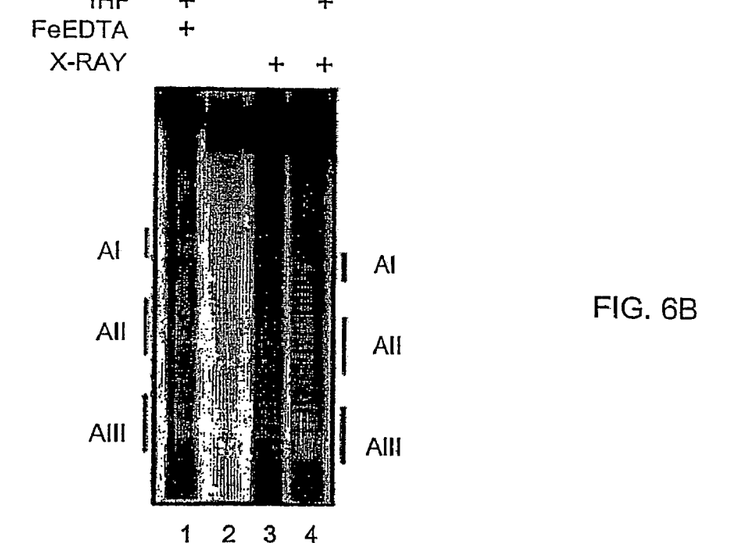
Figure 6C:
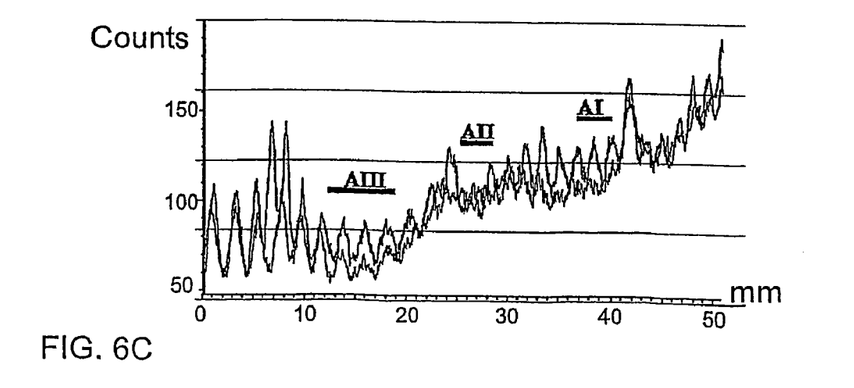

Protein-DNA footprinting—The device of the invention was used to perform protein-DNA footprinting experiments on IHF protein bound to its target DNA sequence. This complex has been characterized by both biochemical and structural studies[22, 30]. IHF binds tightly to three sites along a 34 bp region (see FIG. 6a.). These sites produce three protection regions on the DNA target. The three binding sites of IHF on its target DNA region of 34 bp are marked in black boxes AI, AII and AIII. The interaction of IHF with its substrate DNA produces three protection regions. The 5' end designated with asterisk marks the position of $^{32}$p labeling. FIG. 6b shows IHF-DNA footprinting by both FeEDTA and X-ray methods. 50 nM of IHF was incubated with its target DNA in 10 µl reaction volume at room temperature for 10 min. Sample was exposed to FeEDTA cleavage (lane 1) or to X-ray beam for 1 second (lane 4). Lane 2 is the control DNA and lane 3 is free DNA exposed to X-ray. The three binding sites resulted from the tight binding of IHF with the 34 bp DNA region are marked AI, AII and AIII. All three sites are identified in both lanes 1 and 2. The protein binding sites on the target DNA are marked as AI, AII, AIII, according to their corresponding sequences. These binding sites were analyzed by FeEDTA and in accordance with the invention. The FeEDTA reaction was allowed to proceed for 2 seconds; the X-ray experiments were conducted by irradiating the samples with single exposure of 500 milliseconds. FIG. 6b lanes 1 and 4 show that the three designated IHF binding sites can be clearly identified by FeEDTA and by the method of the invention. Furthermore, these results are in good agreement with recent studies by Dhavan et al., which report the footprinting pattern of the same IHF-DNA complex using the synchrotron X-ray footprinting procedure[31]. FIG. 6c shows densitometry profiles of FIG. 6b, lanes 3 & 4 (black and blue, respectively) showing a decrease in peak intensities upon binding of IHF on the DNA (FIG. 6b, lane 4).

Figure 7:
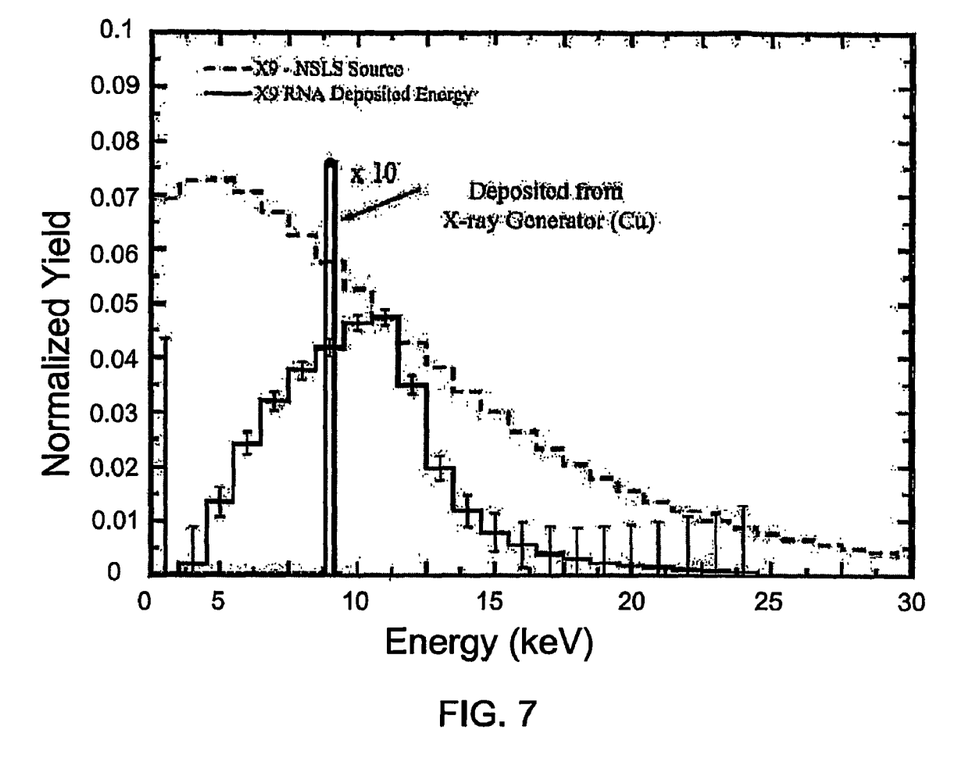
FIG. 7 shows the normalized photon flux spectrum at the X-9 NSLS beam line compared with the normalized absorbed energy distribution on a nucleic acid sample in aqueous solution.

Comparisons of the normalized source spectrum and deposited spectrum on the nucleic acid sample are presented for the synchrotron beam and for various X-ray anodes in FIG. 7. FIG. 7 shows the normalized photon flux spectrum at the X-9 NSLS beam line compared with the normalized absorbed energy distribution on a nucleic acid sample in aqueous solution. The peak energy on the sample falls between 11-12 KeV, in agreement with the results shown in ref.[27]. The error bars represent the simulation results' standard deviation. The energy peak deposited from the X-ray generator with Cu anode source (dotted line) falls very close to the peak of the energy deposited from the X-9 NSLS. These results show that the Cu rotating anode energy is highly consistent with the peak energy absorbed by the sample in the synchrotron source. However, in contrast to the wide range of energies applied to the sample by the synchrotron X-ray beam, the Cu anode spectrum provides a single or very narrow energy range. Overall, these results show that the energy of the absorbed photon, above a given value of photon flux, may be considered as a limiting factor for effective DNA cleavage by X-rays in dilute solutions. Therefore, the material of the target in the rotating anode generator should be carefully selected to obtain effective nucleic acid cleavage in short time scales. Nevertheless, up to 81% of the energy provided by the Cu anode is absorbed in the DNA solution (Table 1), which improves the probability of DNA cleavage by the free —OH radicals.

The invention claimed is:

1. A method for footprinting a nucleic acid molecule comprising:
    (a) placing the nucleic acid molecule in an environment in which —OH radicals are generated when the environment is irradiated with X-rays at an intensity of less than $10^9$ photons $\sec^{-1}$ $mm^{-2}$ for an amount of time less than 1,000 msec;
    (b) irradiating the environment with an X-ray beam produced by a rotating Cu anode X-ray generator at an intensity of less than $10^9$ photons $\sec^{-1}$ $mm^{-2}$ for an amount of time less than 1,000 msec so as to generate —OH radicals in the environment;
    (c) detecting fragmentation of the nucleic acid molecule.

2. The method according to claim 1 wherein the predetermined amount of time is from 100 to 300 msec.

* * * * *